United States Patent
Sasamae et al.

(10) Patent No.: US 11,012,380 B2
(45) Date of Patent: May 18, 2021

(54) MESSAGE COMMUNICATION APPARATUS, NON- TRANSITORY COMPUTER READABLE MEDIUM, AND DISPLAY CONTROL METHOD

(71) Applicant: FUJI XEROX CO., LTD., Tokyo (JP)

(72) Inventors: Mamoru Sasamae, Kanagawa (JP); Kenji Nomura, Kanagawa (JP); Yujiro Kobayashi, Kanagawa (JP); Kiyoshi Yasukawa, Kanagawa (JP); Masaki Kurokawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 10 days.

(21) Appl. No.: 16/559,025

(22) Filed: Sep. 3, 2019

(65) Prior Publication Data
US 2020/0304437 A1    Sep. 24, 2020

(30) Foreign Application Priority Data
Mar. 22, 2019  (JP) .............................. JP2019-054935

(51) Int. Cl.
*H04L 12/58* (2006.01)
*H04N 1/00* (2006.01)

(52) U.S. Cl.
CPC .............. *H04L 51/02* (2013.01); *H04L 51/04* (2013.01); *H04L 51/26* (2013.01); *H04N 1/00395* (2013.01); *H04N 1/00411* (2013.01); *H04N 1/00506* (2013.01)

(58) Field of Classification Search
CPC ......... H04L 51/02; H04L 51/04; H04L 51/26; H04N 1/00395; H04N 1/00411; H04N 1/00506
See application file for complete search history.

(56) References Cited

U.S. PATENT DOCUMENTS

| | | | |
|---|---|---|---|
| 9,325,651 B2* | 4/2016 | Sakuta | H04L 51/18 |
| 10,484,313 B1* | 11/2019 | Sutherland | G06F 3/0488 |
| 10,645,225 B1* | 5/2020 | Stoops | H04M 7/0045 |
| 2003/0182391 A1* | 9/2003 | Leber | G06F 16/951 |
| | | | 709/217 |
| 2017/0324868 A1* | 11/2017 | Tamblyn | H04M 3/58 |
| 2018/0025085 A1* | 1/2018 | Sarangi | H04L 67/02 |
| | | | 707/722 |
| 2019/0158433 A1* | 5/2019 | Yun | G10L 15/26 |
| 2019/0317709 A1* | 10/2019 | Sugimoto | H04L 51/02 |
| 2020/0294101 A1* | 9/2020 | Bell | H04L 51/02 |
| 2020/0344187 A1* | 10/2020 | D'Agostino | G06F 3/0481 |

FOREIGN PATENT DOCUMENTS

JP        2014-164522 A      9/2014

* cited by examiner

*Primary Examiner* — Michael C Lai
(74) *Attorney, Agent, or Firm* — Oliff PLC

(57) ABSTRACT

A message communication apparatus includes an operating unit that activates a chat bot, the chat bot running in a messaging service in which users exchange a message, the chat bot exchanging a message with a user, a registration unit that registers the chat bot for each user, and a controller that, if a single first chat bot has been activated in a single chat room through operation of the operating unit by a first user, causes the first chat bot to execute, in response to a message from a second user different from the first user, a function of a second chat bot registered by the second user by using the registration unit.

9 Claims, 18 Drawing Sheets

| | | FUNCTION INHERITANCE INFORMATION | | |
|---|---|---|---|---|
| CHAT ROOM | CHAT BOT | CHAT BOT a | CHAT BOT b | CHAT BOT c |
| ROOM A | CHAT BOT c | YES | NO | |
| ROOM B | CHAT BOT b | NO | | NO |
| ROOM C | CHAT BOT c | YES | YES | |
| ROOM D | CHAT BOT a | | YES | NO |

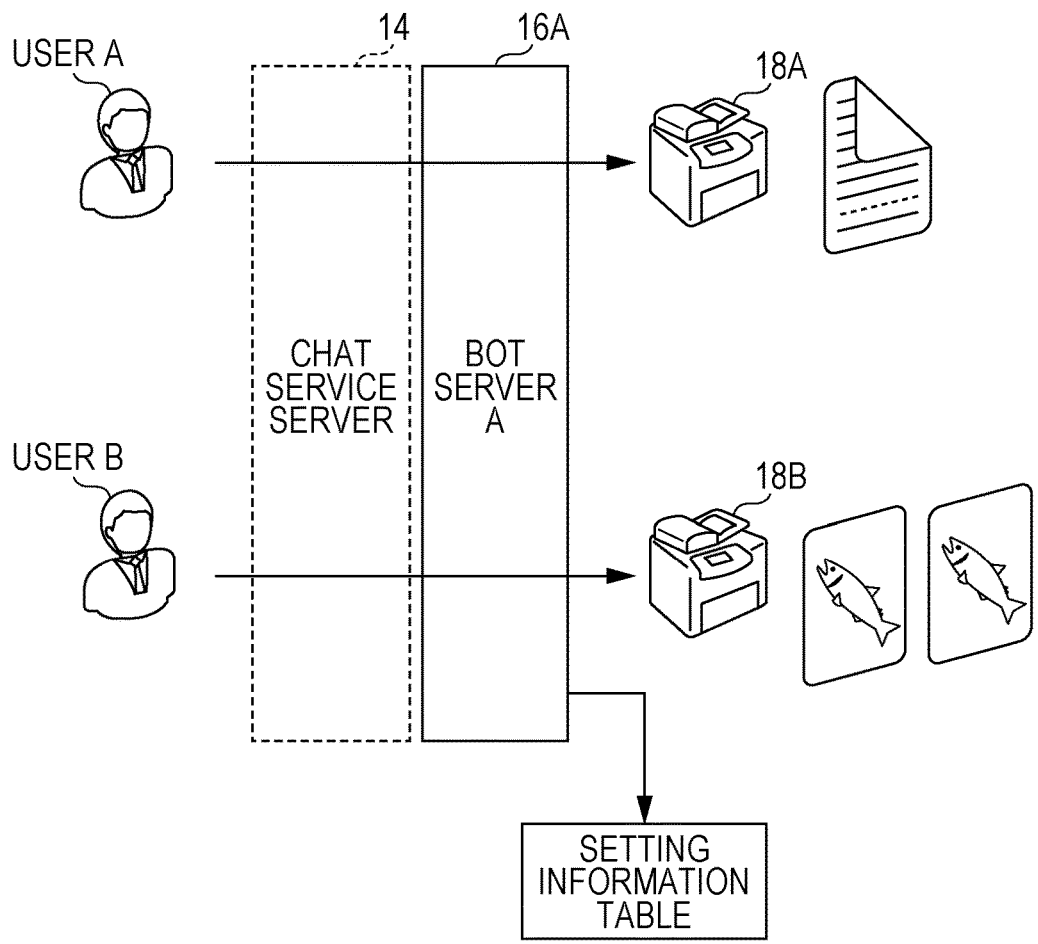

FIG. 9

| CHAT BOT | USER A | USER B | USER C |
|---|---|---|---|
| CHAT BOT a | PRINTER A | PRINTER D | PRINTER F |
| CHAT BOT b | PRINTER B | PRINTER E | |
| CHAT BOT c | PRINTER C | | |

FIG. 11

|  |  | FUNCTION INHERITANCE INFORMATION | | |
|---|---|---|---|---|
| CHAT ROOM | CHAT BOT | CHAT BOT a | CHAT BOT b | CHAT BOT c |
| ROOM A | CHAT BOT c | YES | NO |  |
| ROOM B | CHAT BOT b | NO |  | NO |
| ROOM C | CHAT BOT c | YES | YES |  |
| ROOM D | CHAT BOT a |  | YES | NO |

MESSAGE COMMUNICATION APPARATUS, NON-TRANSITORY COMPUTER READABLE MEDIUM, AND DISPLAY CONTROL METHOD

CROSS-REFERENCE TO RELATED APPLICATIONS

This application is based on and claims priority under 35 USC 119 from Japanese Patent Application No. 2019-054935 filed Month 22, 2019.

BACKGROUND

(i) Technical Field

The present disclosure relates to a message communication apparatus, a non-transitory computer readable medium, and a display control method

(ii) Related Art

Japanese Unexamined Patent Application Publication No. 2014-164522 describes a message notification apparatus that provides notification of a message that reports the result of an operation performed according to an operational instruction from a user, with explicit indication of the destination of the message. An operational instruction detector detects an operational instruction from a message, and identifies a member who has written the message as an instructor. A report message display shows, on a family message board, a message about the result of an operation performed according to the operational instruction, with the instructor explicitly indicated as the destination of the message.

Messaging services exist in which users exchange messages through a chat, a social networking service (SNS), or other methods. For such a messaging service, (human-personified) software robot programs (to be referred to as "chat bots" hereinafter) have been proposed that run in the messaging service and are designed to simulate speech- or text-based interactions with humans. A chat bot is programmed to detect a specific word or phrase from a message entered by a user, and output a suitable response prepared in advance. Some chat bots are managed by a messenger service account that has been assigned to a company, a store, or other such entity for advertising or commercial purposes. Through natural message exchange, the user is able to enjoy conversation with a chat bot in a chat room, and also make the chat bot execute various services.

There are cases where, with multiple users using a chat in a chat room, each individual user makes a chat bot active in the chat room (which will be referred to as "inviting" hereinafter). This results in multiple chat bots existing in the same single chat room. Accordingly, a situation may arise where, when a given user sends a message to a chat bot, another chat bot not intended by the user responds to this message.

In this regard, it would be conceivable to place a restriction such that only one chat bot is allowed to exist in a single chat room. In this case, however, the chat bot is unable to respond to a message from a user different from the user who has invited the chat bot. This leads to reduced convenience.

SUMMARY

Aspects of non-limiting embodiments of the present disclosure relate to a technique for a case where, in a messaging service that allows users to exchange messages in a chat room, only one chat bot is allowed to run in a single chat room to exchange a message with a user. The technique enables execution of a function provided by a chat bot not existing in the messaging service and desired by the user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a message communication apparatus including an operating unit that activates a chat bot, the chat bot running in a messaging service in which users exchange a message, the chat bot exchanging a message with a user, a registration unit that registers the chat bot for each user, and a controller that, if a single first chat bot has been activated in a single chat room through operation of the operating unit by a first user, causes the first chat bot to execute, in response to a message from a second user different from the first user, a function of a second chat bot registered by the second user by using the registration unit.

BRIEF DESCRIPTION OF THE DRAWINGS

Exemplary embodiment of the present disclosure will be described in detail based on the following figures, wherein:

FIG. 4 illustrates registration of setting information according to the exemplary embodiment;

FIG. 5 illustrates a setting information table according to the exemplary embodiment;

FIG. 9 illustrates registration of chat bots for each individual user according to the exemplary embodiment;

FIG. 11 illustrates a function inheritance table according to the exemplary embodiment;

DETAILED DESCRIPTION

An exemplary embodiment of the present disclosure will be described below with reference to the drawings. The following description assumes that a chat bot according to the exemplary embodiment is a chat bot that provides a service with which a printing process is executed in response to a message from a user (to be referred to as print service hereinafter).

Figure 1:
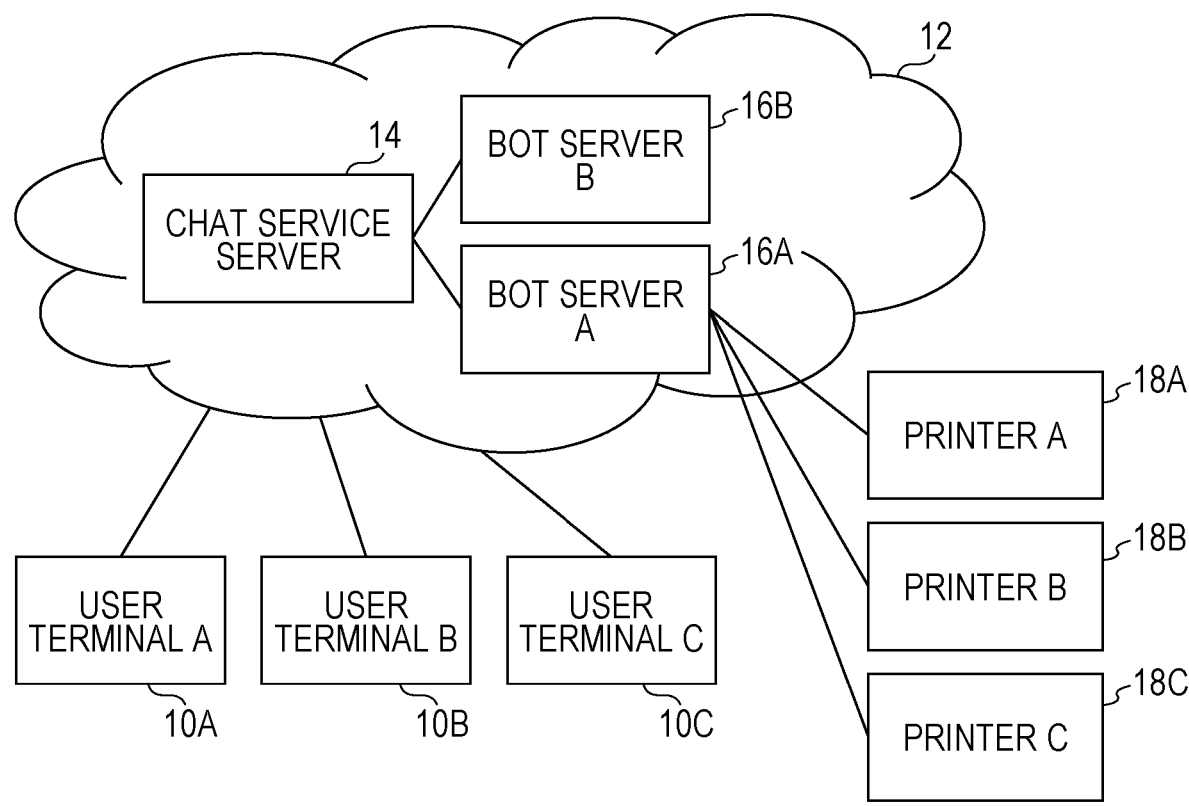
FIG. 1 illustrates a system configuration according to an exemplary embodiment.

FIG. 1 illustrates the general configuration of a messaging service system according to the exemplary embodiment. The messaging service system includes user terminals A to C (10A to 10C), a chat service server 14, bot servers A and B (16A and 16B), and printers A to C (18A to 18C).

The user terminals A to C (10A to 10C) each represent a terminal used by a user of a messaging service. Examples of such user terminals include smart phones, tablet terminals, and personal computers (PCs). Although FIG. 1 depicts three user terminals, the user terminal A (10A), the user terminal B (10B), and the user terminal C (10C), there may be any number of user terminals. A user operates the user terminal A, B, or C (10A, 10B, or 10C) to access the chat service server 14 in a cloud 12, and exchanges a message with another user or a chat bot. The following description assumes that a user A operates the user terminal A, a user B operates the user terminal B, and a user C operates the user terminal C. The user terminals A to C (10A to 10C) are connected with the chat service server 14 in such a way that allows data to be transmitted and received via a wired or wireless communication network. An example of a communication network is a public line such as the Internet. Alternatively, the communication network may be a private line.

The chat service server 14 is a cloud server in the cloud 12 that provides a chat service. The chat service server 14 includes one or more server computers. The chat service server 14 executes overall processing related to message exchange, such as sending and receiving of messages to and from the user terminals A to C, and displaying of a screen for displaying message sending and reception. In addition to handling message exchange between two users, the chat service server 14 provides the ability to create a group of three or more users, and handle exchange of messages within the group (group chat). Further, the chat service server 14 operates in cooperation with the bot server A (16A) and the bot server B (16B) to handle message exchange with respect to chat bots provided by the bot server 16A and the bot server 16B. Examples of user-to-chat bot message exchange include message exchange between a single user and the corresponding chat bot, and message exchange between multiple users and the corresponding chat bots.

The bot server A (16A) and the bot server B (16B) each serve as a message communication apparatus according to the exemplary embodiment. Each of the bot server A (16A) and the bot server B (16B) is installed with a software robot program for implementing a chat bot that handles message exchange with users. Each bot server executes the program. Each of the bot server A (16A) and the bot server B (16B) may be managed by a messenger service account assigned to a company, a store, or other such entity for advertising and commercial purposes.

Each of the bot server A (16A) and the bot server B (16B) operates in cooperation with the chat service server 14 via a specific application programming interface (API). Each bot server handles message exchange with a user, and automatically responds to a message from the user and returns a message. The specific API is an API for using the chat service server 14. Although any API system may be employed, an exemplary API may be an API in Javascript Object Notation (JSON) format, with which JSON data in a specified format is sent to a specific URL of the chat service server 14 in POST or GET format, and the result is returned as data in JSON format.

If a message from a user contains an operational instruction instructing that a specific process be executed, the bot server A (16A) and the bot server B (16B) each execute a specific kind of service according to the operational instruction. In the exemplary embodiment, the bot server A (16A) serves as a "print bot" that, if a message from a user contains a print instruction instructing that printing be executed, causes the printer A (18A), the printer B (18B), or the printer C (18C) to operate in accordance with the print instruction and execute printing. In this regard, the bot server 16B is capable of providing any given service in accordance with an operational instruction provided from a user. Although FIG. 1 depicts two bot servers, the bot server A (16A) and the bot server B (16B), there may be any number of bot servers. A single bot server may constitute multiple chat bots.

The bot server A serving as a chat bot (or print bot) drives each of the printers A to C in accordance with setting information registered for each user in advance and related to operation of the software robot program, and executes printing. It can be also said that such setting information represents an operational condition for operating each of the printers A to C. For example, the user A enters and registers, through operation on the user terminal A, setting information for operating the printer A, and the user B enters and registers, through operation on the user terminal B, setting information for operating the printer B.

The printer A (18A), the printer B (18B), and the printer C (18C) each execute printing in response to a command from the bot server A. The number of printers is not limited to three but may be four or more.

Figure 2:
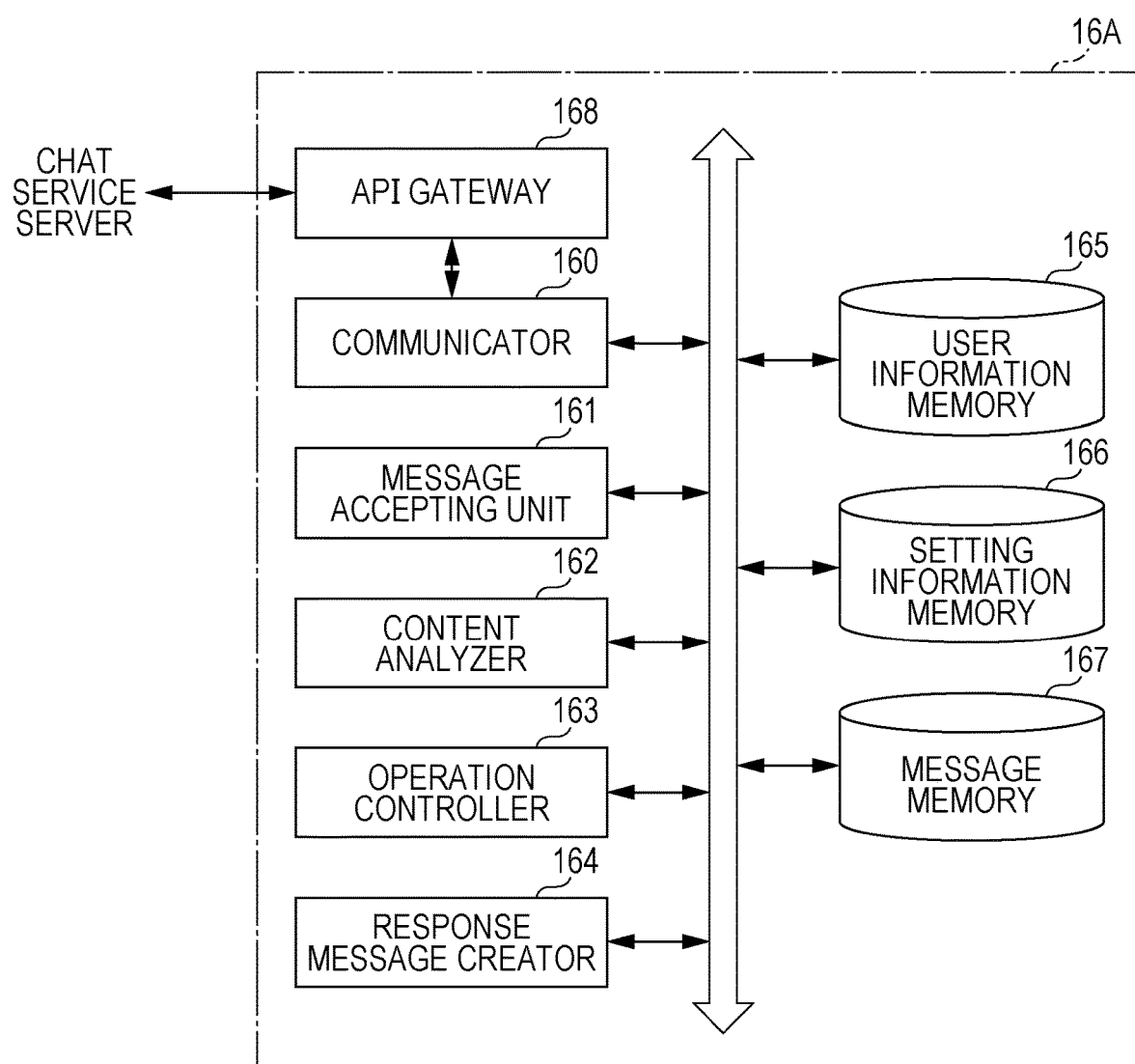
FIG. 2 is a functional block diagram according to the exemplary embodiment.

FIG. 2 is a functional block diagram of the bot server A (16A). The bot server A includes, as functional blocks, a communicator 160, a message accepting unit 161, a content analyzer 162, an operation controller 163, a response message creator 164, a user information memory 165, a setting information memory 166, a message memory 167, and an API gateway 168.

The communicator 160 communicates with the chat service server 14 and with the printer A, B, or C. The communicator 160 communicates with the chat service server 14 via the API gateway 168 to exchange messages. The communicator 160 outputs, to the message accepting unit 161, a message received from the chat service server 14 via the API gateway 168, that is, a message from each of the user terminals A to C. The communicator 160 also sends a response message created by the response message creator 164 to the chat service server 14 (i.e., each of the user terminals A to C) via the API gateway 168. Further, in accordance with a command from the operation controller 163, the communicator 160 outputs a print command to the printer A, B, or C to drive the printer A, B, or C.

The message accepting unit 161 accepts input of a message from the communicator 160, and outputs the message to the content analyzer 162. The message contains a message related to registration of setting information. The message accepting unit 161 sequentially stores each received message into the message memory 167.

The content analyzer 162 analyzes the contents of an accepted message, and outputs the analysis results to the operation controller 163. Specifically, the content analyzer 162 recognizes a user identifier (user ID) contained in an accepted message, and extracts a text portion included in the message and executes a syntax analysis of the extracted test portion. Any syntax analysis method may be employed. For example, an input message is broken into morphemes, and then nouns, adjectives, verbs, and interrogative pronouns are extracted as keywords. If the text portion of a message contains an operational instruction, the content analyzer 162 analyzes the operational instruction, and outputs the analysis results to the operation controller 163. Examples of operational instructions according to the exemplary embodiment include a print instruction with respect to each of the printers A, B, and C and setting information on each of the printers A, B, and C.

The operation controller 163 functions as a controller. Based on the analysis results obtained by the content analyzer 162, the operation controller 163 registers individual users and the corresponding printers A, B, and C into the setting information memory 166 in association with each other. The operation controller 163 also outputs a print command to the printer A, B, or C via the communicator 160.

The response message creator 164 creates a response message in accordance with the analysis results obtained with the content analyzer 162, and sends the response message to the chat service server 14 via the communicator 160.

The user information memory 165 stores, in the form of a table, information about each user who uses the chat service server 14, in particular, information about a user who uses a chat bot implemented by the bot server A. Each chat bot is assigned a specific account for use in the chat service implemented by the chat service server 14. A user specifies this account and performs a predetermined operation to thereby confirm to use the chat bot. An example of such user information is a user ID. The user information memory 165 may store information on what authority each individual user has.

The setting information memory 166 stores, in the form of a table, setting information for each individual user who uses a chat bot implemented by the bot server A. Setting information may include items such as identification information of a printer to be used, color mode, paper size, and the number of copies. However, items of setting information to be stored as a table are not limited to those mentioned above. Setting information may be determined in accordance with the kind of service to be provided by the bot server A. If the service to be provided is a print service, setting information is information related to printing, and if the service to be provided is a search service, setting information is information related to search conditions. As such, setting information defines what kind of service is provided, and may contain multiple items.

A user operates a menu displayed on the user terminal and registers a chat bot and a printer in association with each other. Information on what chat bot is associated with what printer for each user is stored into the setting information memory 166 as a table. Further, a user operates a menu displayed on the user terminal and invites a chat bot previously registered by the user to a chat room, thus making the chat bot active in the chat room. Specifically, the user selects "Invite" from the menu displayed on the user terminal, and specifies a desired chat bot to thereby invite the chat bot. Techniques for inviting another user in a chat service, or inviting a chat bot to a chat room are known in the art. In response to the user inviting a chat bot, the operation controller 163 adds to the chat bot a flag indicating that the chat bot has been invited, and stores the resulting information into the setting information memory 166. By referencing a table stored in the setting information memory 166, the operation controller 163 identifies chat bots registered for individual users, and also identifies which chat bot has been invited to a chat room.

The message memory 167 stores a history of messages accepted from the user by the message accepting unit 161.

Figure 3:
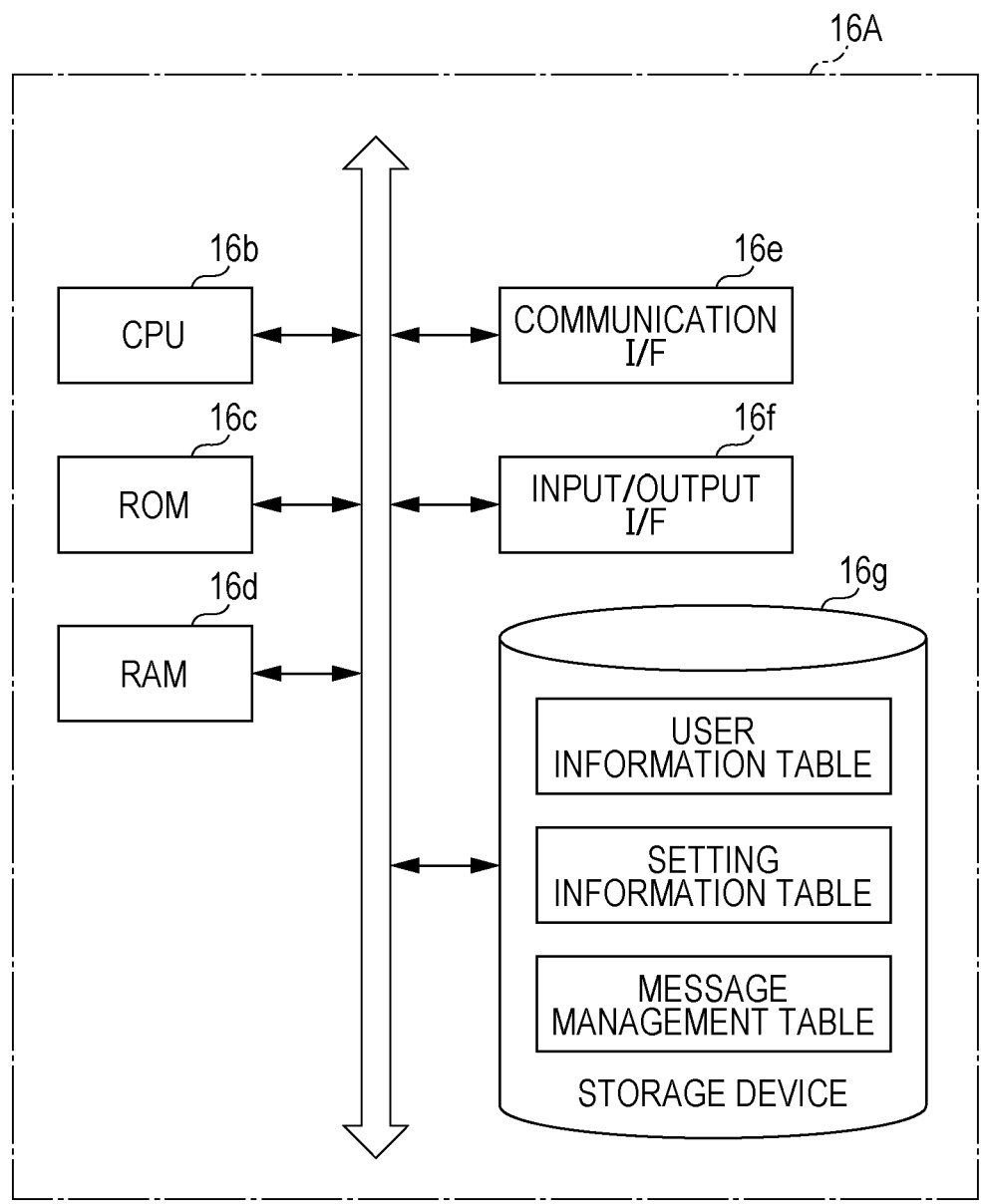
FIG. 3 is a block diagram illustrating a configuration according to the exemplary embodiment.

FIG. 3 is a block diagram illustrating the configuration of the bot server A. The bot server A, which is made up of one or more server computers, includes at least one CPU 16b, a ROM 16c, a RAM 16d, a communication interface (I/F) 16e, an input/output I/F 16f, and a storage device 16g.

In implementing the function of a chat bot, the at least one CPU 16b reads out a bot app stored in the ROM 16c or the storage device 16g, and uses the RAM 16d as a working memory. That is, the CPU 16b automatically responds to a message from a user, and if the message contains an operational instruction, the CPU 16b drives the printer A, B, or C in accordance with the operational instruction. The CPU 16b executes the bot app to implement the following components illustrating FIG. 2: the message accepting unit 161, the content analyzer 162, the operation controller 163, the response message creator 164, and the API gateway 168. The CPU 16b functions as an operating unit, a controller, and a registration unit.

The communication I/F 16e handles exchange of messages with the chat service server 14, and outputs a print command to the printer A, B, or C.

The input/output I/F 16f sends and receives data to and from an input device such as a keyboard or a mouse, an image output device such as a display device, or other devices.

The storage device 16g is implemented by a hard disk drive (HDD), a solid state drive (SSD), or other such non-volatile memory. The storage device 16g stores, in addition to a bot app, a user information table, a setting information table, and a message management table. The storage device 16g implements the user information memory 165, the setting information memory 166, and the message memory 167 that are illustrated in FIG. 2.

Although a software robot program for implementing the function of a chat bot is executed by the CPU in the exemplary embodiment, a part of the function of a chat bot may be implemented not by execution of a program but by hardware processing. Such hardware processing may be performed by using circuitry such as an ASIC or a field programmable gate array (FPGA).

The following describes registration of setting information, with respect to the user A and the user B by way of example.

FIG. 4 schematically illustrates a setting registration process performed by the user A and the user B.

The user A and the user B each perform, with respect to a chat bot to which a specific account has been assigned in a chat service, a specific operation corresponding to use of the chat bot. Then, the bot server A (16A) assigns a user identifier (user ID) to each of the user A and the user B. The bot server A (16A) also assigns, to each of the printers A to C, a printer identifier (printer ID) for uniquely identifying the printer. As such a user ID, a chat service account of each of the user A and the user B may be used as it is.

Then, the user A sends a message to the bot server A (16A) via the chat service server 14, causing the bot server A (16A)

to register setting information while specifying the printer A, the printer B, or the printer C. For example, the user A specifies the printer A, and then sends a message with the following items of information specified as setting information:
Color Mode: Color
Paper Size: A4
Number of Copies: 1

Upon receiving such a message, the bot server A analyzes the contents of the message, and if the message is interpreted to be setting information, the bot server A associates the user A with the printer A and then records the above-mentioned setting information into the setting information table.

The same applies to the user B. The user B sends a message to the bot server A (16A) via the chat service server 14, causing the bot server A (16A) to register setting information while specifying the printer A or the printer B. For example, the user B specifies the printer B, and then sends a message with the following items of information specified as setting information:
Color Mode: Monochrome
Paper Size: Letter
Number of Copies: 2

Upon receiving such a message, the bot server A analyzes the contents of the message, and if the message is interpreted to be setting information, the bot server A associates the user B with the printer B and then records the above-mentioned setting information into the setting information table.

FIG. 5 illustrates an exemplary setting information table stored in the setting information memory 166. For each user, printer, color (color mode), size (paper size), and the number of copies (the number of sets) are recorded in association with each other. More specifically, for each piece of user identification information, printer identification information, color (color mode), size (paper size), and the number of copies (the number of sets) are recorded in association with each other.

Figure 6:
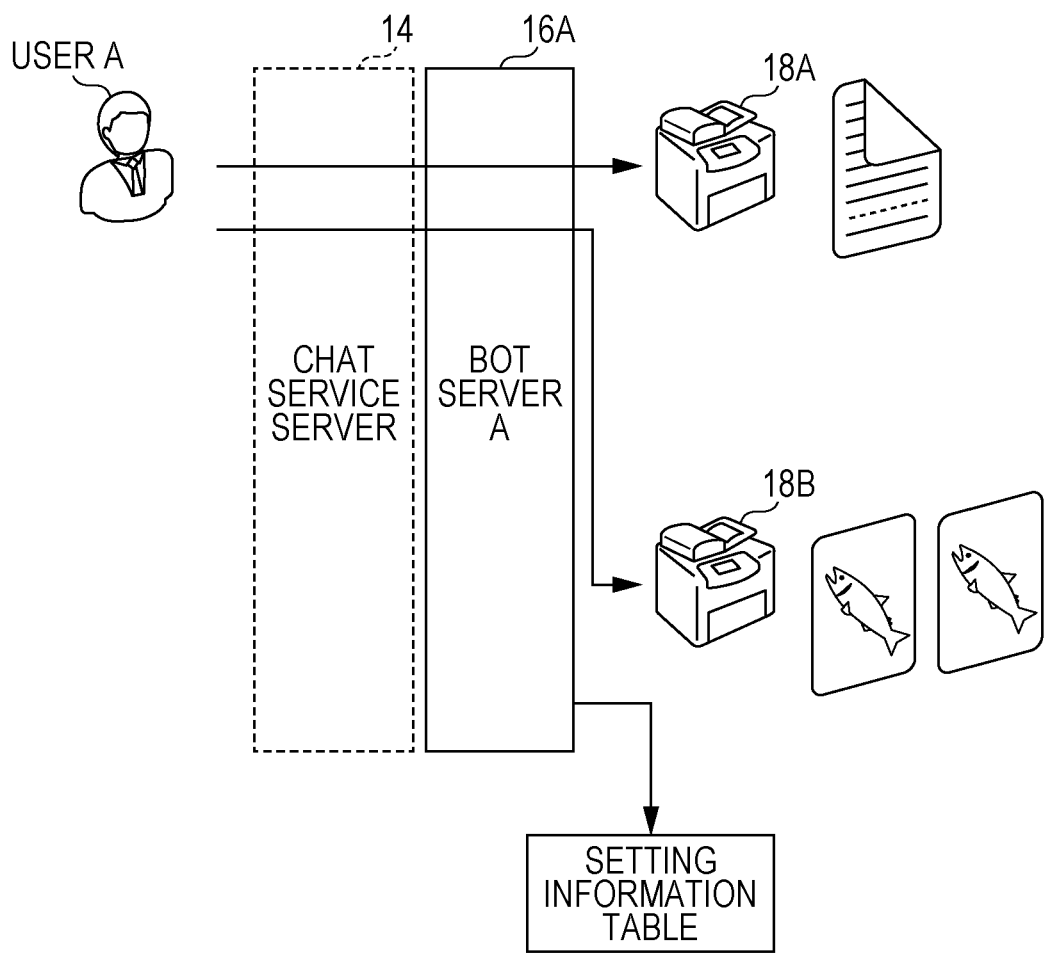
FIG. 6 illustrates switching of printers by the same user.

In this regard, there are also often cases where the user A wants to not only register setting information with respect to the printer A but also register a different set of setting information with respect to the printer B. Examples of such cases include when, as illustrated in FIG. 6, after the user A registers setting information with respect to the printer A, the user A registers a different set of setting information with respect to the printer B. For instance, with respect to the printer A, the user A registers the following items of information as setting information on the printer A:
Color Mode: Color
Paper Size: A4
Number of Copies: 1

Then, with respect to the printer B, the user A registers the following items of information as setting information on the printer B:
Color Mode: Monochrome
Paper Size: Letter
Number of Copies: 2

The bot server A associates the user A with the printer A and setting information on the printer A, and also associates the user A with the printer B and setting information on the printer B. The bot server A registers these pieces of associated information into the setting information table. Then, in response to an instruction from the user A, the bot server A switches between the printer A and the printer B to select one of the printers, and drives the selected printer.

Figure 7:
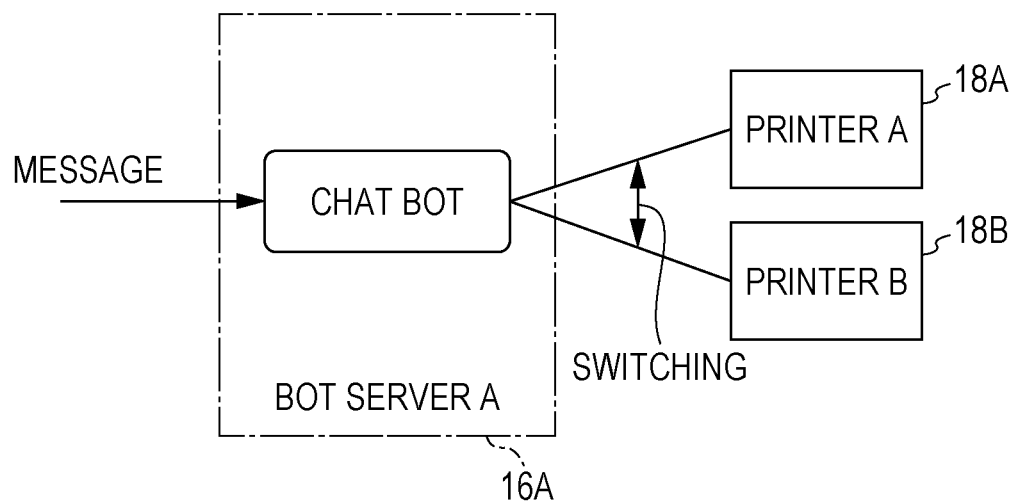
FIG. 7 illustrates switching of multiple printers by a single chat bot.

FIG. 7 schematically illustrates a process performed by a chat bot implemented by the bot server A. The chat bot operates in conjunction with two printers, the printer A and the printer B, in providing a print service to the user A. The chat bot associates the user A with the printer A and the printer B. Upon receiving a message from the user A, the chat bot analyzes the contents of the message. If the contents of the message correspond to the printer A, the chat bot switches to the printer A and executes a print service. If the contents of the message correspond to the printer B, the chat bot switches to the printer B and executes a print service.

At this time, the user A has to perform a cumbersome operation of switching between the printer A and the printer B in accordance with the kind of the print service to be provided. For example, when wishing to print at the printer A, the user A has to send the following message to the chat bot:
"Print @ printer A".

When wishing to print at the printer B, the user A has to send the following message to the chat bot:
"Print @ printer B".

This means that the user A has to send an appropriate message while paying particular attention to what printer is associated with what kind of setting information. This results in a rather cumbersome process. In particular, if a print service is to be provided by the chat bot operating in conjunction with, in addition to the printers A and B, the printer C and even more different printers, such switching action becomes more cumbersome with increasing number of printers to be switched.

Although it would be conceivable to set one of such multiple printers as a default printer and, in response to a print instruction, use this default printer, the same switching action as described above is still necessary if a printer different from the default printer is to be used.

In this regard, the need for the user to perform cumbersome switching of printers may be mitigated by employing a configuration in which multiple chat bots are implemented by the bot server A, with each chat bot operating in conjunction with one or more printers.

Figure 8:
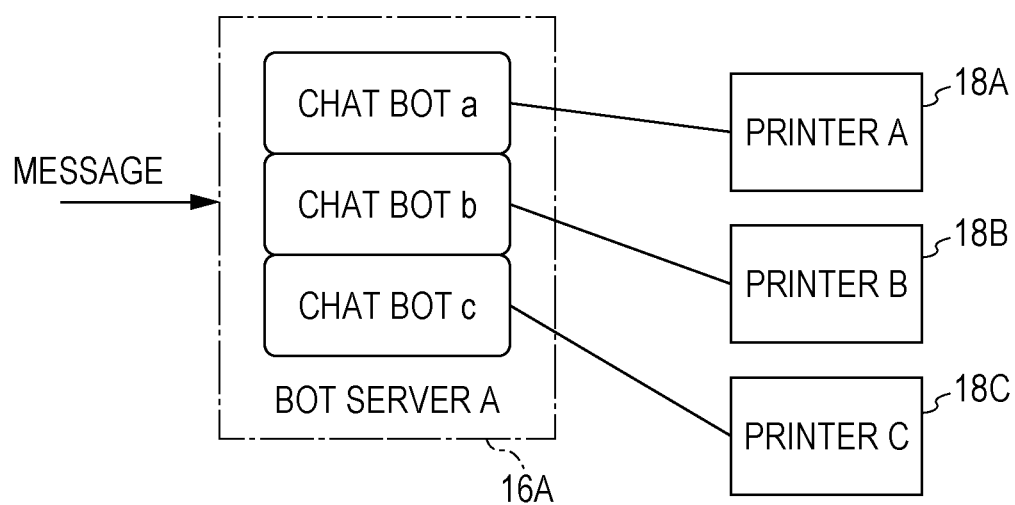
FIG. 8 illustrates associations between individual chat bots and the corresponding printers according to the exemplary embodiment.

FIG. 8 schematically illustrates a process performed by multiple chat bots implemented by the bot server A.

Three chat bots a to c are implemented by the bot server A. The chat bots a to c are identical in function in that each chat bot operates in conjunction with a printer, and drives the printer in accordance with a message from a user. The chat bots a to c are all implemented by identical software robot programs. These software robot programs may be individually installed, or may be implemented as different program modules constituting the same single program.

The chat bot a operates in conjunction with, for example, the printer A. In accordance with a message from a user, the chat bot a drives the printer A and provides a print service.

The chat bot b operates in conjunction with, for example, the printer B. In accordance with a message from a user, the chat bot b drives the printer B and provides a print service.

The chat bot c operates in conjunction with, for example, the printer C. In accordance with a message from a user, the chat bot c drives the printer C and provides a print service.

If a user wants to print at the printer A, the user sends, to the chat bot a, a message such as "Print" instructing that printing be performed. If a user wants to print at the printer B, the user sends, to the chat bot b, a message such as "Print" instructing that printing be performed. If a user wants to print at the printer C, the user sends, to the chat bot c, a message such as "Print" instructing that printing be performed. In this way, printing may be performed at a desired printer by the user simply sending the above-mentioned message to the printer.

The conjunction relationships between individual chat bots a to c and the corresponding printers A to C may not be fixed but may be set dynamically for each individual user. An example of such a case is when, for the user B, the chat bot a operates in conjunction with the printer B and the chat bot c operates in conjunction with the printer C, and for the user C, the chat bot a operates in conjunction with the printer A.

FIG. 9 illustrates, for each individual user, an exemplary conjunction relationship between each individual chat bot and the corresponding printer according to the exemplary embodiment. With respect to the user A, the chat bot a and the printer A operate in conjunction with each other, the chat bot b and the printer B operate in conjunction with each other, and the chat bot c and the printer C operate in conjunction with each other. With respect to the user B, the chat bot a and a printer D operate in conjunction with each other, and the chat bot b and a printer E operate in conjunction with each other. With respect to the user C, the chat bot a and a printer F operate in conjunction with each other. The chat bots a to c each register, into the setting information table, information about what chat bot is associated with what printer. From a user ID contained in a message received from a user, the chat bots a to c each identify the corresponding printer by referencing the setting information table, and drives the identified printer.

Although FIGS. 8 and 9 depict a case where a single chat bot operates in conjunction with a single printer, this is not to be construed in a limiting sense. Alternatively, a single chat bot may operate in conjunction with multiple printers.

In exchanging messages with another user in a chat room, the user A, the user B, or the user C invites a pre-registered chat bot into the chat room, thus setting the chat bot active. For example, in exchanging messages with the user B, the user A invites the chat bot a from among pre-registered chat bots a to c, thus activating the chat bot a. Likewise, the user B invites the chat bot b, which is a pre-registered chat bot, thus activating the chat bot b. If, in the same chat room, multiple users each invite a desired chat bot from among pre-registered chat bots, this results in multiple chat bots being set active in the same chat room. In this case, a situation may arise where, when a given user sends a message to a chat bot, another chat bot not intended by the user responds to this message.

In this regard, it would be conceivable to place a restriction such that only one chat bot is allowed to exist in a single chat room. In one exemplary case, for instance, once the user A invites the chat bot c, then subsequent inviting of a chat bot by the user B or the user C is restricted. In this case, when the user B sends a message such as "Print", a chat bot that has been invited and is thus active in the chat room at this time is the chat bot c related to the user A. Since the chat bot c is unable to respond to the message from the user B, printing is not executed. This leads to reduced convenience.

Figure 10:
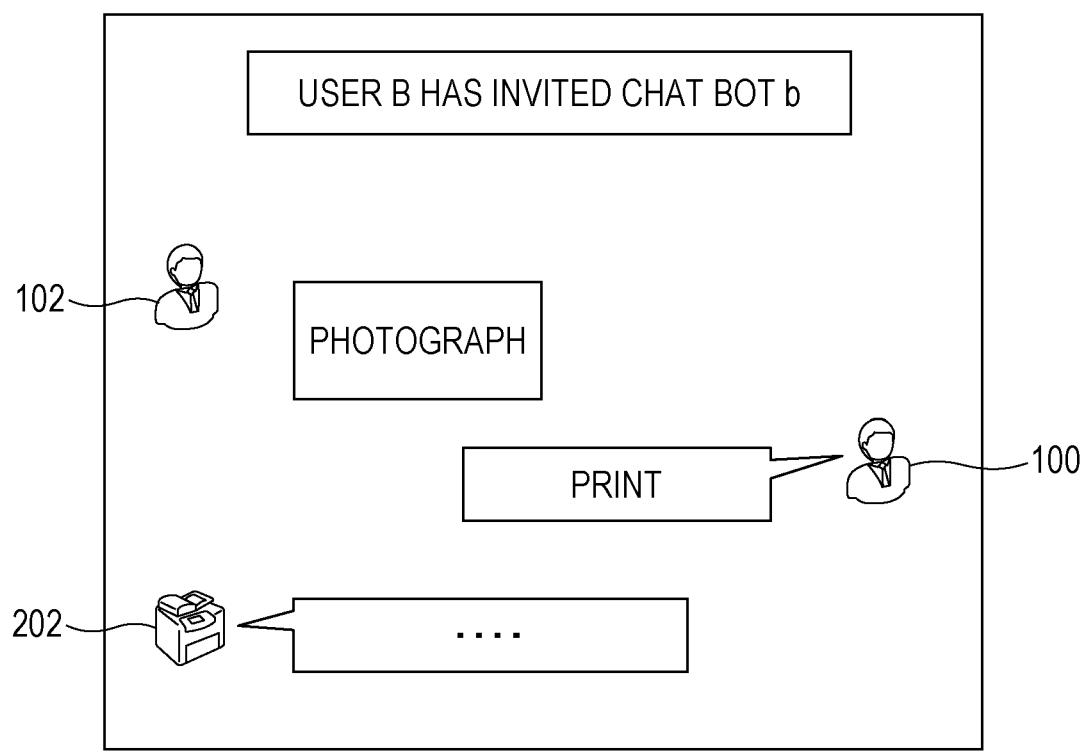
FIG. 10 illustrates a screen display according to a reference example.

FIG. 10 illustrates an exemplary reference screen displayed on the user terminal A operated by the user A. The reference screen corresponds to a case where the user A, the user B, and the user C participate in the same chat room and exchange messages. In this case, the user B has invited the chat bot b into the current chat room and thus activated the chat bot b.

On the screen, the following message is displayed to indicate that the user B has invited the chat bot b:
"User B has invited chat bot b".

Then, the user B represented by a representative graphic (to be referred as "icon" hereinafter) 102 sends a photograph. Upon seeing the photograph, the user A represented by an icon 100 sends a message "Print" to instruct that the photograph be printed. However, the chat bot b, which is active in the chat room, does not respond to this message, and thus printing is not executed.

At this time, the user A may want to invite, into the chat room, the chat bot a that the user A has previously registered. However, since the chat bot b is already active in the chat room, the user A is unable to invite the chat bot a to make the chat bot a execute the printing instructed to be performed by the user A.

Accordingly, in the exemplary embodiment, for each chat room and each chat bot, information as to whether it is possible to inherit the function of another chat bot is stored in the setting information memory 166 in advance. The operation controller 163 references such function inheritance information, and controls a chat bot invited into a chat room such that the chat bot will inherit and execute the function of a chat bot that has not been invited to the chat room.

FIG. 11 illustrates an exemplary function inheritance information table stored in the setting information memory 166. The function inheritance table is a table that specifies, in association with each chat room and each chat bot, whether it is possible to inherit the function of another chat bot (a chat bot that has previously been registered by a user).

For example, in a chat room A, the chat bot c inherits the function of the chat bot a, but does not inherit the function of the chat bot b. In another chat room B, the chat bot b does not inherit the function of any chat bot. Further, in a chat room C, the chat bot c inherits the function of the chat bot a and the function of the chat bot b. In this regard, when it is stated that the chat bot c inherits the function of the chat bot a, this means that the chat bot c responds as if acting as the chat bot a. More specifically, this means that the chat bot c instructs the chat bot a to execute a process, the chat bot a executes the process in response to the instruction, and the chat bot c sends a message representing the result of execution of the process by the chat bot a. It can be said that the chat bot c responds to a message, and the chat bot a performs the actual execution of a process.

Although the table in FIG. 11 specifies function inheritance information for each individual chat room, such a table may specify only function inheritance information for a given chat room.

Figure 12:
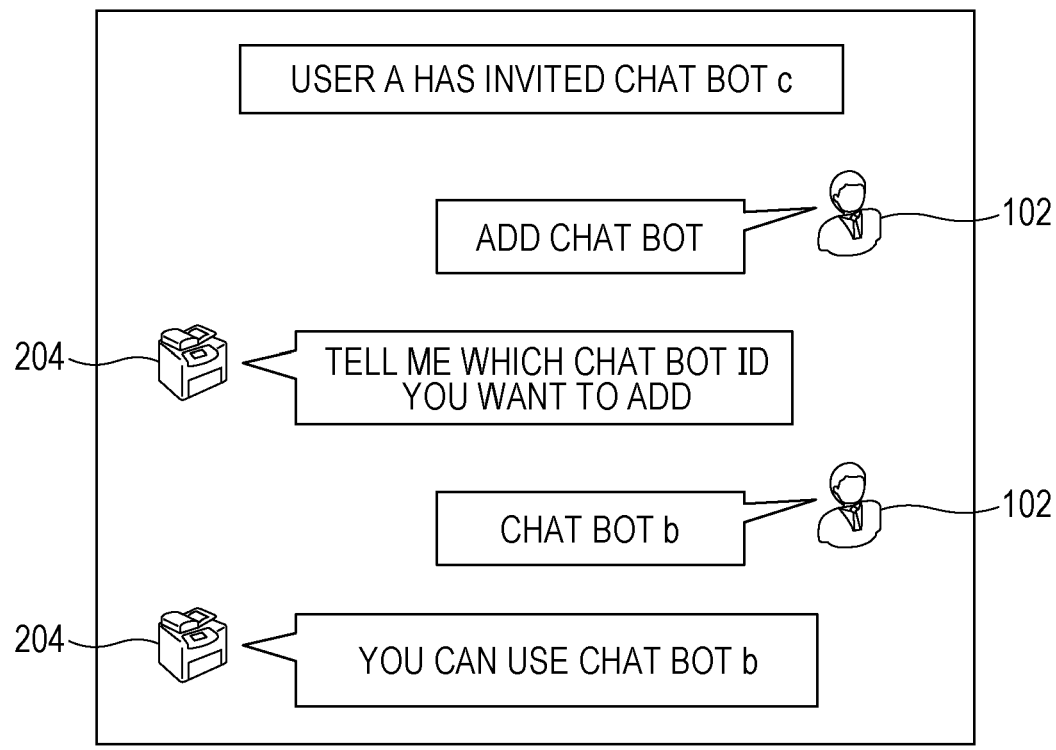
FIG. 12 illustrates a screen displayed on a user terminal according to the exemplary embodiment (Part 1)

FIG. 12 illustrates an exemplary reference screen displayed on the user terminal A operated by the user A according to the exemplary embodiment. The reference screen corresponds to a case where the user A, the user B, and the user C participate in the same chat room and exchange messages. In this case, the user A has invited the chat bot c into the current chat room and thus activated the chat bot c. Further, it is assumed that, as illustrated in the function inheritance table of FIG. 11, the chat bot c is able to inherit the function of the chat bot b.

On the screen, the following message is displayed to indicate that the user A has invited the chat bot c:
"User A has invited chat bot c".

In FIG. 12, the chat bot c is denoted by reference sign 204.

Then, the user B represented by a representative graphic (to be referred as "icon" hereinafter) 102 sends the following message:
"Add chat bot".

Upon receiving this message, the operation controller 163 controls the chat bot c such that the chat bot c responds to this message. As a result, the chat bot c represented by the icon 204 responds with the following message:
"Tell me which chat bot ID you want to add".

In response to this message, the user B specifies the chat bot b that the user B has previously registered, and sends a message "Chat bot b".

Upon receiving this message, the operation controller 163 references the function inheritance table and determines whether the chat bot c is able to inherit the function of the chat bot b. If the chat bot c is able to inherit the function of the chat bot b, the operation controller 163 controls the chat bot c such that the chat bot c returns the following message as a response:

"You can use chat bot b".

Figure 13:
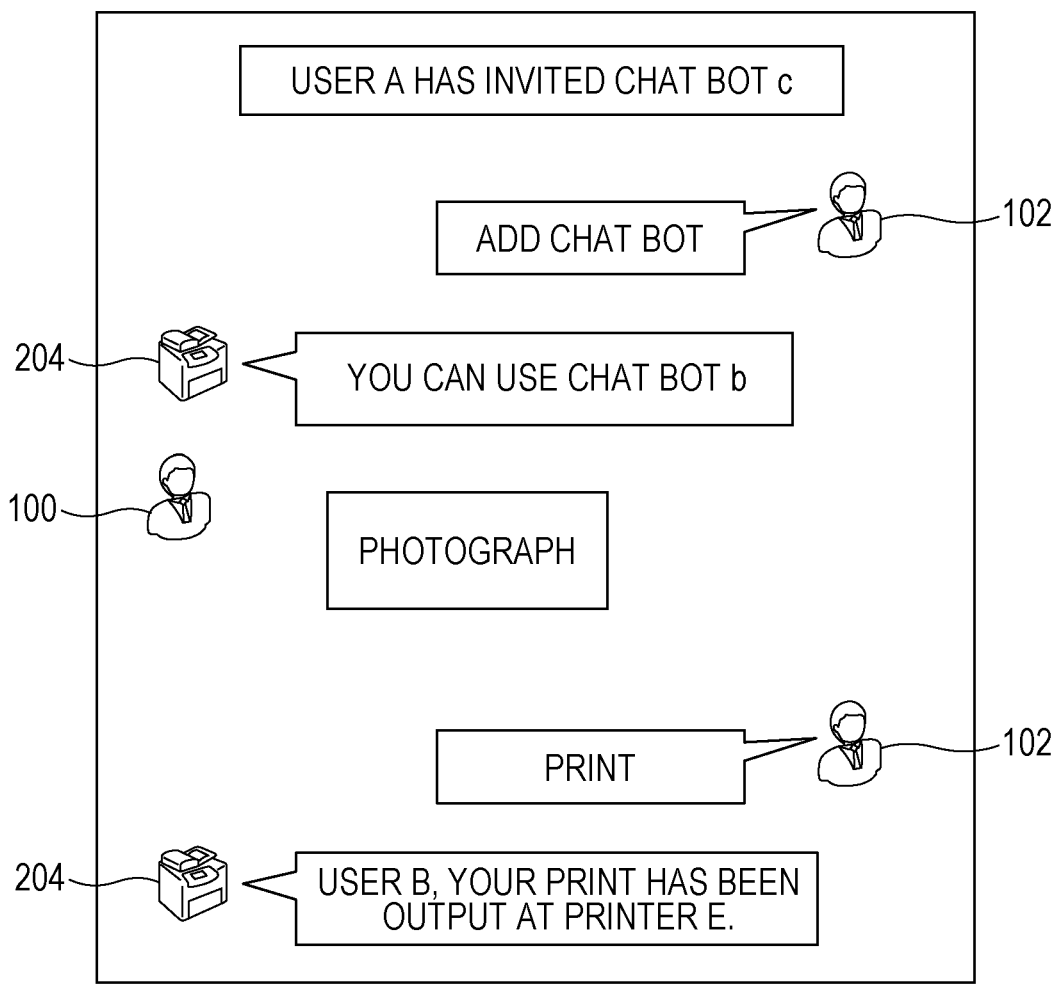
FIG. 13 illustrates a screen displayed on a user terminal according to the exemplary embodiment (Part 2)

FIG. 13 illustrates another exemplary screen.

On the screen, the following message is displayed to indicate that the user A has invited the chat bot c:

"User A has invited chat bot c".

Then, the user B represented by the icon 102 sends the following message:

"Add chat bot".

Upon receiving this message, the operation controller 163 controls the chat bot c so as to respond to this message. The operation controller 163 also references the function inheritance table, and identifies the chat bot b to be a chat bot that is able to inherit the function of the chat bot c. Then, the operation controller 163 controls the chat bot c such that the chat bot c responds with the following message:

"You can use chat bot b".

Function inheritance refers to inheriting of a function. Examples of such functions to be inherited include settings on a destination printer.

Subsequently, the user A sends a photograph. When the user B responds to this by sending a message "Print", the chat bot c instructs the chat bot b to execute printing, and the chat bot b completes printing in response to this instruction. Upon the completion of printing by the chat bot b, the chat bot c represented by the icon 204 responds with the following message:

"User B, your print has been output at printer E".

In this regard, the printer E is a printer associated with the chat bot b (see FIG. 9).

It is to be noted that in the present case, even though the user B has not activated the chat bot b by inviting the chat bot b into the chat room, the chat bot b executes printing in response to a message from the user B.

In FIGS. 12 and 13, only one chat bot exists in a chat room. That is, it is assumed that only one chat bot is allowed to exist in a single chat room. For a case where only one chat bot is allowed to exist in a given chat room but multiple chat bots are allowed to exist in another chat room, the other chat room may be used in responding to a message from a user.

In FIGS. 12 and 13, the chat bot c inherits the function of the chat bot b based on the function inheritance table illustrated in FIG. 11. In this regard, if the chat bot c is unable to inherit the function of the chat bot b, this results in printing being unable to be executed by the chat bot b. Further, there is also a need to store the function inheritance table as illustrated in FIG. 11 into the setting information memory 166 in advance. Accordingly, to address these issues, another chat room may be used in responding to a message from a user without using the function inheritance table.

Figure 14A:
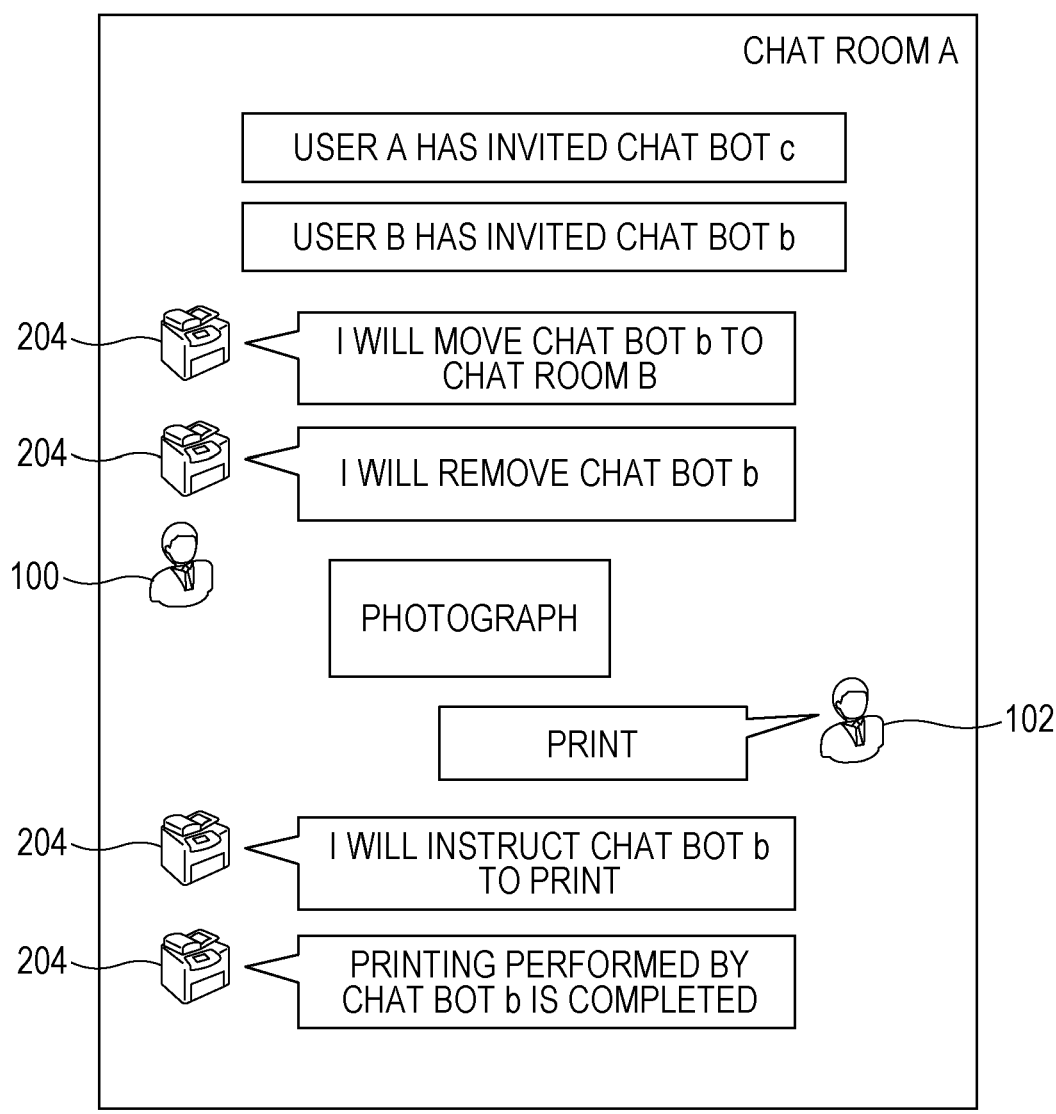
FIG. 14A illustrates a screen displayed on a user terminal according to the exemplary embodiment (Part 3)
Figure 14B:
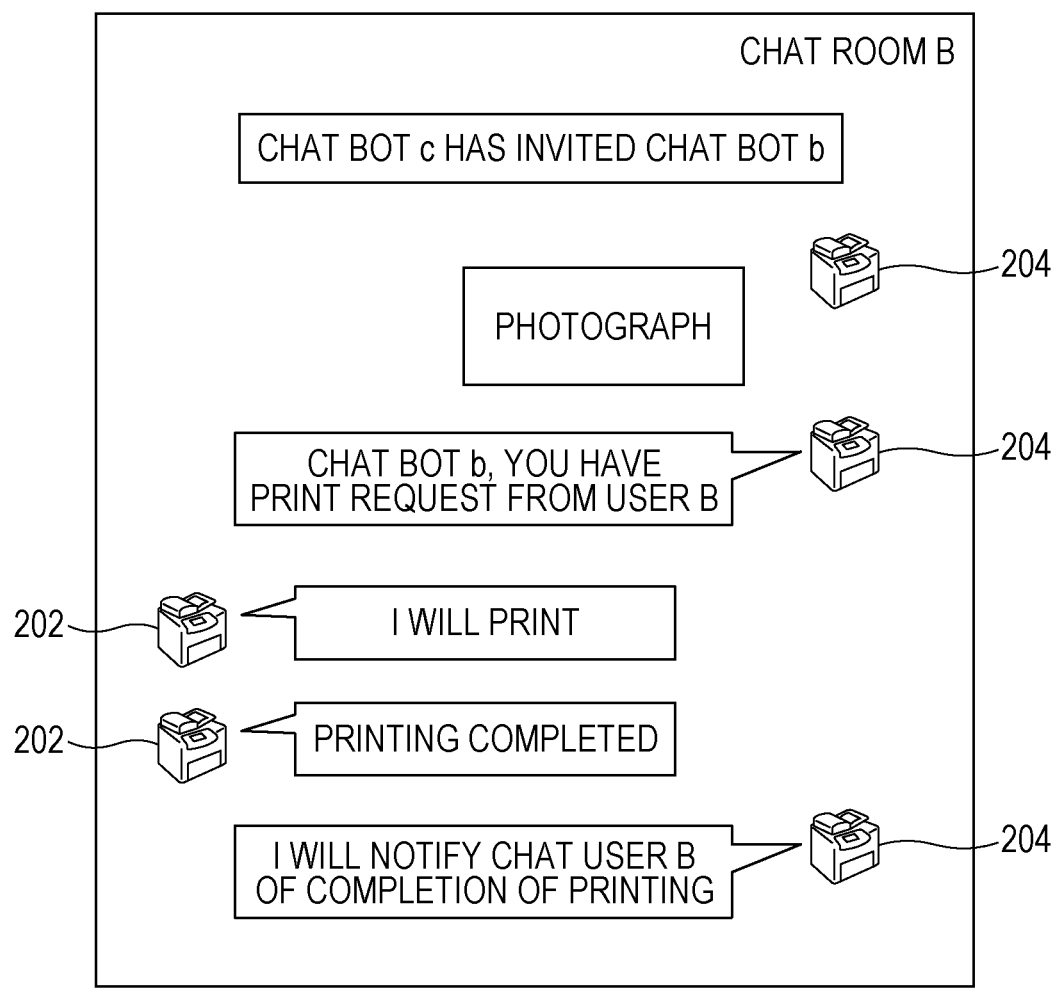
FIG. 14B illustrates a screen displayed on a user terminal according to the exemplary embodiment (Part 4)

FIG. 14A and FIG. 14B each illustrate an exemplary screen in this case. FIG. 14A illustrates an exemplary screen for the chat room A in which a single chat bot is allowed to exist, and FIG. 14B illustrates an exemplary screen for the chat room B in which multiple chat bots are allowed to exist. The chat room B corresponds to a messaging service different from the chat room A.

In FIG. 14A, the following messages are displayed on the screen to indicate that the user A has invited the chat bot c, and that the user B has subsequently invited the chat bot b:

"User A has invited chat bot c".

"User B has invited chat bot b".

However, in the chat room A, only one chat bot is allowed to exist, and two or more chat bots are not allowed to exist. Accordingly, the operation controller 163 causes the chat bot c, which is the first invited chat bot, to respond with the following message to create the chat room B:

"I will move chat bot b to chat room B".

Further, the operation controller 163 causes the chat bot c to send the following message to remove the invitation of the chat bot b to the chat room A:

"I will remove chat bot b".

In FIG. 14A, although the message "User B has invited chat bot b" is displayed, the message "I will remove chat bot b" is also displayed. This means that only one chat bot is currently present in the chat room.

FIG. 14B illustrates an exemplary screen for the chat room B created by the operation controller 163. After causing the message "I will move chat bot b to chat room B" to be returned as a reply in FIG. 14A, the operation controller 163 automatically invites the chat bot b to the chat room B, thus activating the chat bot b. Then, the operation controller 163 sends the following message:

"Chat bot c has invited chat bot b".

Now, returning to 14A again, when the user A sends a photograph, and the user B responds to this by sending a message "Print", the chat bot c responds with the following message:

"I will instruct chat bot b to print".

Returning to FIG. 14B again, after the chat bot c responds with the message "I will instruct chat bot b to print" in FIG. 14A, the operation controller 163 sends the photograph sent from the user A to the chat room B. Further, the operation controller 163 causes the chat bot c to send the following message:

"Chat bot b, you have printing request from user B".

That is, the chat bot c sends the message from the user B on behalf of the user B.

The chat bot b, which has been invited to the chat room B and is thus active, returns the following message in response to the message from the chat bot c:

"I will print".

The chat bot b then executes printing. Once printing of the photograph is completed, the chat bot b sends the following message:

"Printing completed".

The chat bot c responds to this message with the following message:

"I will notify user B of completion of printing".

Returning to FIG. 14A again, once printing with the chat bot b is completed, in the chat room A, the chat bot c sends the following message:

"Printing performed by chat bot b is completed".

In this case as well, even though the user B has not activated the chat bot b, the chat bot b executes printing in response to the message from the user B. Further, the operation controller 163 does not have to reference the function inheritance table as illustrated in FIG. 11. Furthermore, although the chat room B is created as a new chat room, in the chat room B, the user B does not have to provide a separate instruction to the chat bot b to instruct that printing be executed by the chat bot b. That is, message exchange in the chat room B takes place between chat bots.

In FIG. 14B, in the chat room B, the chat bot c sends, to the chat bot b, a print request message to request for printing, and the chat bot b executes printing in response to this message. In this regard, there may be cases where the chat bot b does not have an output authority with respect to the print request message from the chat bot c, and is controlled such that the chat bot b will output only in response to a message from the user B who has registered the chat bot b. In this case, rather than causing a print request message to be sent from the chat bot c to the chat bot b, the operation controller 163 causes the user B to be invited to the chat room.

Figure 15:
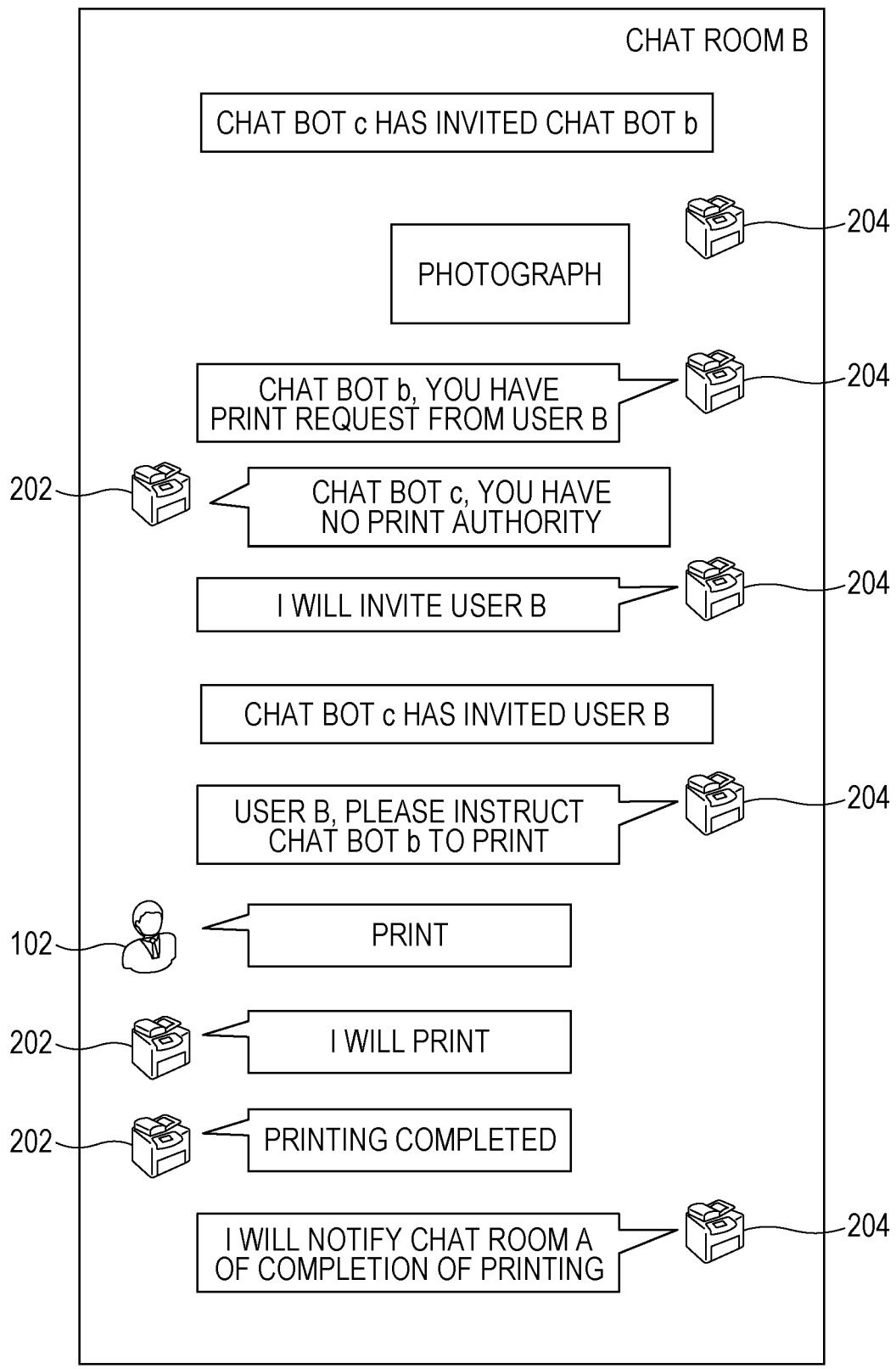
FIG. 15 illustrates a screen displayed on a user terminal according to the exemplary embodiment (Part 5)

FIG. 15 illustrates an exemplary screen in this case. As in FIG. 14B, FIG. 15 illustrates an exemplary screen for the chat room B. As in FIG. 14B, the operation controller 163 sends the following message:
"Chat bot c has invited chat bot b".

The operation controller 163 then sends, to the chat room B, a photograph sent from the user A, and causes the following message to be sent from the chat bot c:
"Chat bot b, you have print request from user B".

If the chat bot b, which has been invited to the chat room and is thus active, does not have an output authority, the chat bot b responds to the message from the chat bot c by sending the following message and does not execute printing:
"Chat bot c, you have no print authority".

The operation controller 163 controls the chat bot c such that the chat bot c sends the following message, thus inviting the user B to the chat room B:
"I will invite user B".

Once the invitation is completed, the operation controller 163 sends the following message:
"Chat bot c has invited user B".

Since both the user B and the chat bot b have now been invited to the chat room B, the chat bot b is able to execute printing in response to an instruction from the user B. Specifically, the chat bot c sends the following message to prompt the user B to provide a print instruction:
"User B, please instruct chat bot b to print".

The user B sends a message "Print" in response to this message. In response to the message from the user B, the chat bot b sends the following message and executes printing of the photograph:
"I will print".

Once printing is completed, the following message is sent:
"Printing completed".

Once printing by the chat bot b is completed, the chat bot c sends the following message:
"I will notify chat room A of completion of printing".

In this regard, in FIG. 15, since the user B has been invited to the chat room B, and also a print instruction has been provided in the chat room B, the process in which the chat bot c sends the message "I will notify chat room A of completion of printing" may be omitted.

In FIGS. 14A and 14B, the user B provides a print instruction. In this regard, in providing such a print instruction for the second time onward, the operation controller 163 may further create another chat room to handle the print instruction.

Figure 16A:
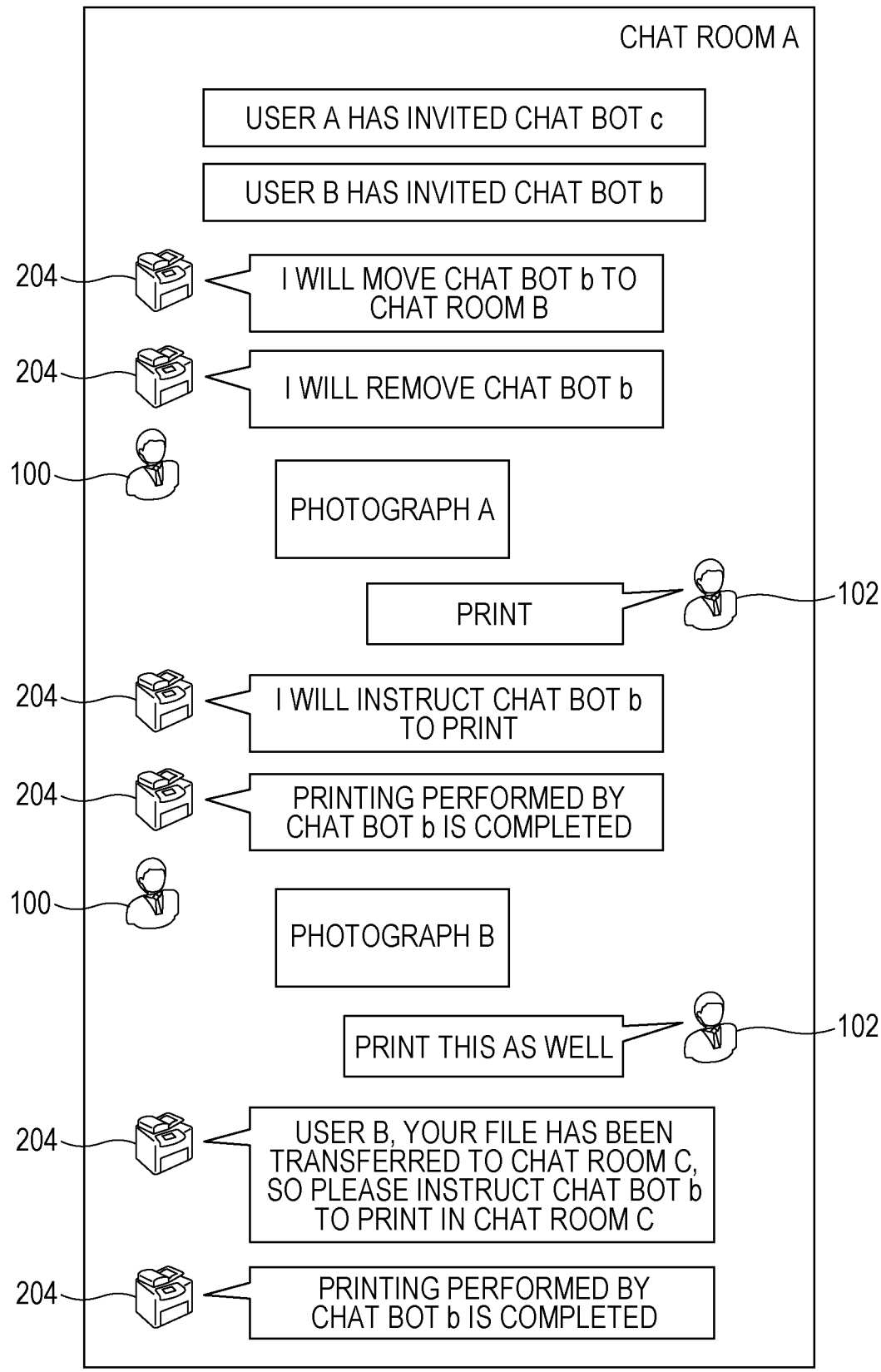
FIG. 16A illustrates a screen displayed on a user terminal according to the exemplary embodiment (Part 6)
Figure 16B:
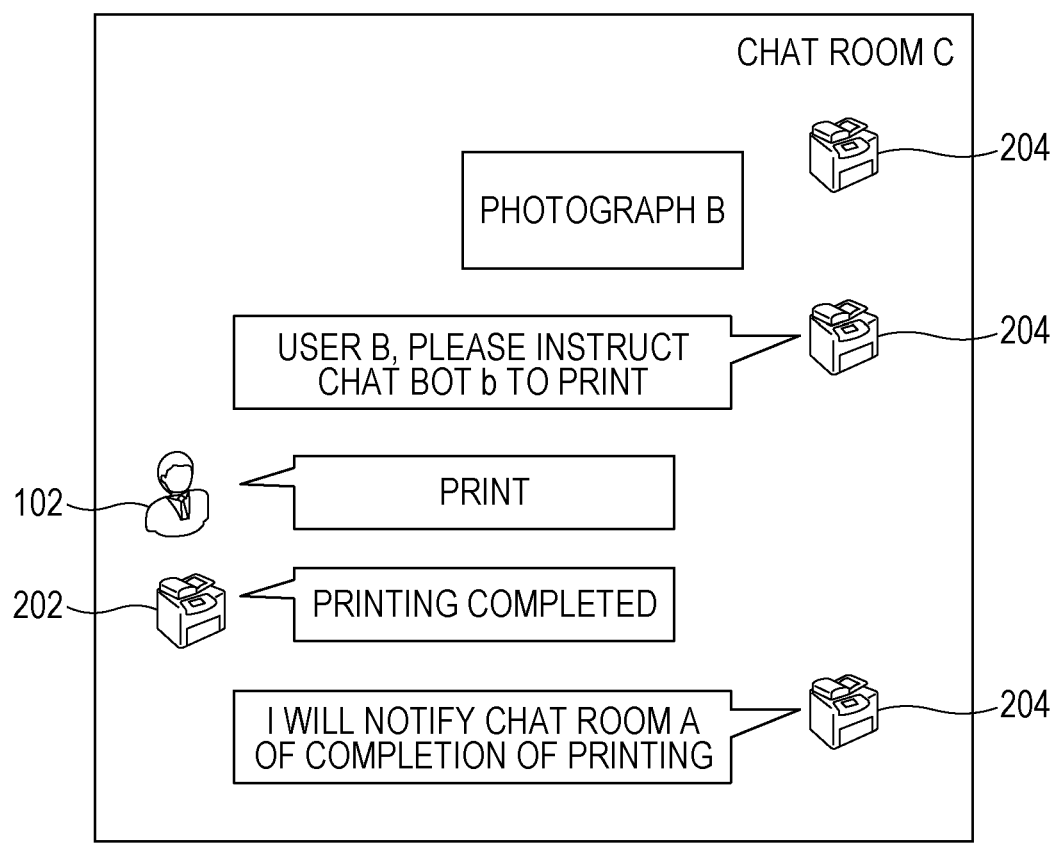
FIG. 16B illustrates a screen displayed on a user terminal according to the exemplary embodiment (Part 7)

FIG. 16A and FIG. 16B each illustrate an exemplary screen in this case. FIG. 16A illustrates an exemplary screen for the chat room A, and FIG. 16B illustrates an exemplary screen for the chat room C. An exemplary screen for the chat room B is the same as the exemplary screen illustrated in FIG. 14B and is thus not illustrated here.

First, as illustrated in FIG. 16A, the following messages are displayed on the screen to indicate that the user A has invited the chat bot c, and that the user B has subsequently invited the chat bot b:
"User A has invited chat bot c".
"User B has invited chat bot b".

However, in the chat room A, only one chat bot is allowed to exist, and two or more chat bots are not allowed to exist. Accordingly, the operation controller 163 causes the chat bot c, which is the first invited chat bot, to respond with the following message to create the chat room B:
"I will move chat bot b to chat room B".

Further, the operation controller 163 causes the chat bot c to send the following message to remove the invitation of the chat bot b to the chat room A:
"I will remove chat bot b".

Then, the user A sends a photograph. When the user B responds to this by sending a message "Print", the chat bot c responds with the following message:
"I will instruct chat bot b to print".

Once printing with the chat bot b is completed in the chat room B, in the chat room A, the chat bot c sends the following message:
"Printing performed by chat bot b is completed".

Subsequently, the user A further sends a photograph B. In response to this, the user B sends the following message to provide a print instruction for the second time:
"Print this as well".

The operation controller 163 then controls the chat bot c such that the chat bot c responds to this message with the following message:
"User B, your file has been transferred to chat room C, so please instruct chat bot b to print in chat room C".

The operation controller 163 creates the chat room C, which is a third chat room different from the chat rooms A and B, and transfers the photograph B to the third chat room C.

In FIG. 16B, the photograph B is transferred from the chat bot c, and the following message is sent from the chat bot c:
"User B, please instruct chat bot b to print".

In response to this message, the user B sends a message "Print". Then, the chat bot b executes printing in response to this message. Once printing is completed, the chat bot b sends the following message:
"Printing completed".

Further, the chat bot c sends the following message:
"I will notify chat room A of completion of printing".

Although an exemplary embodiment of the present disclosure has been described above, the present disclosure is not limited to the described exemplary embodiment but may be practiced with various modifications. Such modifications will be described below.

Modification 1

Figure 17:
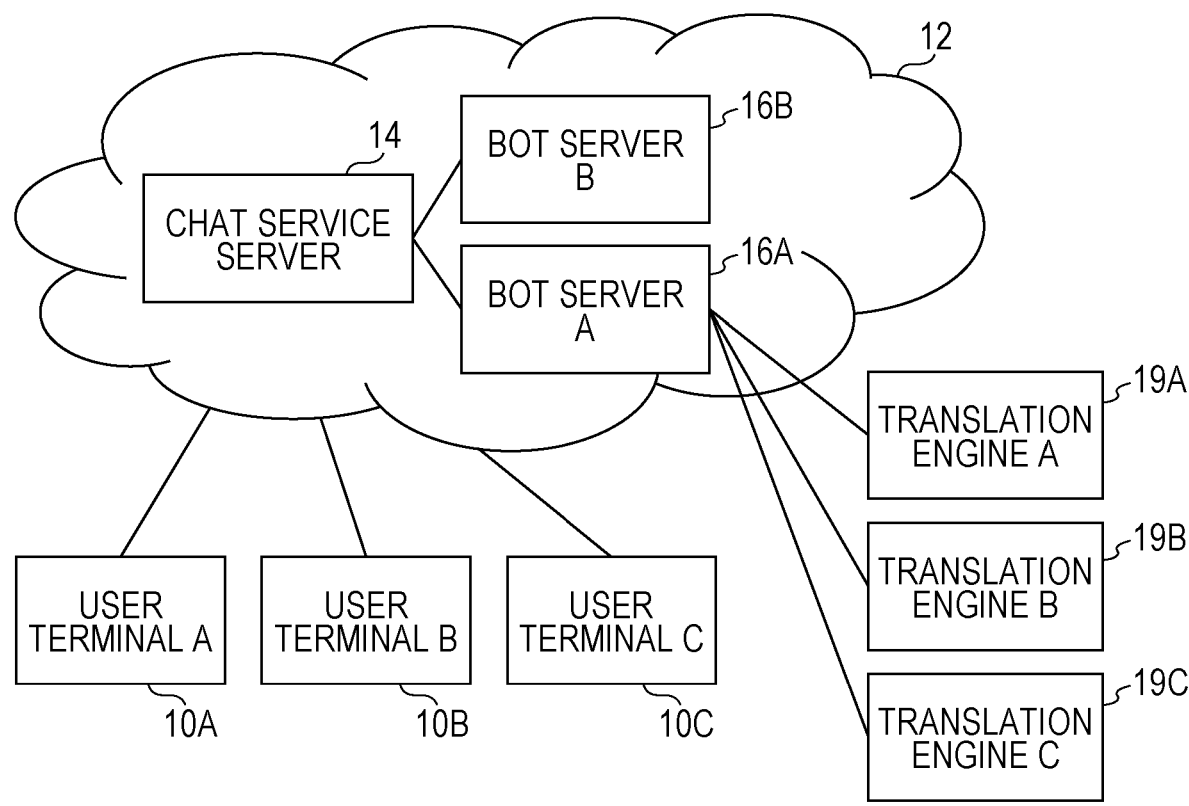
FIG. 17 illustrates a system configuration according to a modification.

The foregoing description of the exemplary embodiment assumes that the chat bot used is a chat bot that provides a print service in response to a message from a user. However, the chat bot may be capable of providing any services other than the print service. Examples of such services include:
  Search service for content such as music, news articles, accommodations, books, or food recipes
  Ticket booking service
  Service for selling items on online flea market site/search/ transactional communication
  Translation service into other languages FIG. 17 illustrates a system configuration for a case where a translation service is executed. Unlike in FIG. 1, the system includes, as external apparatuses or devices, a translation engine A (19A), a translation engine B (19B), and a translation engine C (19C) instead of the printer A (18A), the printer B (18B), and the printer C (18C). The translation engine A represents a program (and a translation apparatus or device installed with the program) for translating Japanese into English, the translation engine B represents a program (and a translation apparatus or device installed with the program) for translating Japanese into Chinese, and the translation engine C represents a program (and a translation apparatus or device installed with the program) for translating Japanese into Spanish.

The user A selects the translation engine A, and sets and registers, as setting information, a format such that the original Japanese is displayed following the English translation. As a result, if the user A sends a message "Kyo-wa-aite-imasuka?" ("Are you free?" in Japanese) to a chat bot, the chat bot drives the translation engine A and automatically responds as follows:
"Are you free today?".
"Kyo-wa-aite-imasuka?".

For a case where there is an upper limit (e.g., two) on the number of translation engines with which a single chat bot may operate in conjunction, if a chat bot is already operating in conjunction with the translation engines A and B, and if a user desires translation with the translation engine C in this state, a new chat bot is added, and the added chat bot is associated with the translation engine C.

If the number of chat bots that may exist in a single chat room is restricted to one, a translation process may be executed by another chat bot in accordance with the function inheritance table as illustrated in FIG. 11, or another chat bot may be invited to another chat room so as to execute a translation process in the other chat room.

In the case of a search service, search engines may be used instead of translation engines as external apparatuses or devices. Setting information in this case refers to search conditions. For example, in the case of a search for accommodations, such search conditions may include the number of days, price, hotel grade, and the number of persons. If an upper limit number of times for search condition switching is reached, a new chat bot is added, and the added chat bot and a search engine for a specific search condition are associated with each other. Combinations of printers and printing conditions may be substituted by combinations of search engines and search conditions.
Modification 2

In the foregoing description of the exemplary embodiment, two chat bots are allowed to exist in the chat room B as illustrated in FIG. 14B. In this regard, if the number of chat bots that may exist in the chat room B is also restricted to one as in the chat room A, the operation controller 163 may invite only the chat bot b to the chat room B, such that a message from the user B directed to the chat bot b in the chat room A is directly reflected on the chat room B to thereby instruct the chat bot b to execute printing.
Modification 3

In the foregoing description of the exemplary embodiment, the operation controller 163 executes processes including inheritance of functions between chat bots, creation of another chat room, and invitation of a user to another chat room. Alternatively, a controller or control module different from the operation controller 163 may act as a chat bot management agent and execute these processes.
Modification 4

In the exemplary embodiment, if the user A invites the chat bot c to the chat room A, and then a print instruction is sent from the user B, the operation controller 163 may interpret the instruction from the user B to be a print instruction directed to the chat bot b that has been previously registered by the user B but has not been invited to the chat room A, and temporarily swap the chat bots c and b in order to execute the print instruction.

Figure 18:
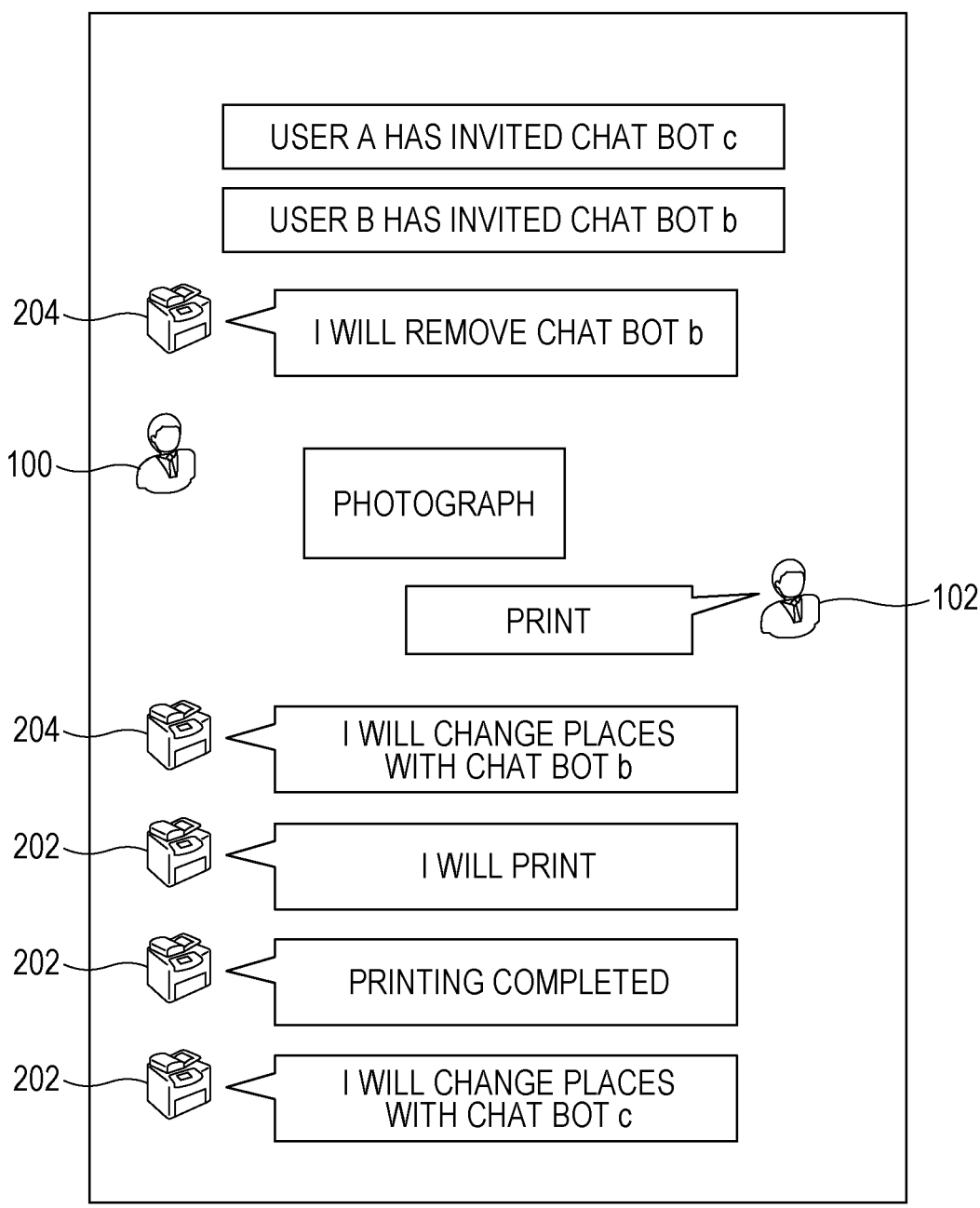
FIG. 18 illustrates a screen displayed on a user terminal according to a modification.

FIG. 18 illustrates an exemplary screen in this case. On the screen, the following messages are displayed to indicate that the user A has invited the chat bot c, and that the user B has subsequently invited the chat bot b:
"User A has invited chat bot c".
"User B has invited chat bot b".

However, in the current chat room, only one chat bot is allowed to exist, and two or more chat bots are not allowed to exist. Accordingly, the operation controller 163 causes the chat bot c, which is the first invited chat bot, to send the following message to remove the invitation of the chat bot b to the chat room:
"I will remove chat bot b".

Then, the user A sends a photograph. When the user B responds to this by sending a message "Print", the operation controller 163 interprets the print instruction from the user B to be a print instruction directed to the removed chat bot b, and temporarily swaps the chat bot c to the chat bot b. Accordingly, the chat bot c sends the following message so that the chat bot c is removed and the chat bot b is invited to the chat room instead:
"I will change places with chat bot b".

In response to the instruction from the user B, the chat bot b represented by an icon 202, which has been thus invited to the chat room, sends the following message and executes printing:
"I will print".

Once printing is completed, the chat bot b sends the following message:
"Printing completed".

Upon the completion of printing, the operation controller 163 swaps the chat bot b to the chat bot c again. That is, the chat bot b sends the following message so that the chat bot b is removed and the chat bot c is invited to the chat room instead:
"I will change places with chat bot c".

It is to be noted that in FIG. 18, either one of the chat bots c and b is active in the chat room. Based on an operation made by the user B to invite the chat bot b, the operation controller 163 is able to objectively detect that the user B has the intention to use the chat bot b.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A message communication apparatus comprising:
a memory; and
a processor programed to
activate a chat bot, the chat bot running in a messaging service in which users exchange messages, the chat bot configured to exchange messages with the users using the messaging service;

register the chat bot for each user; and if a single first chat bot has been activated in a single chat room through an operation made by a first user, cause the first chat bot to execute, in response to a message from a second user different from the first user, a function of a second chat bot registered by the second user based on (i) function inheritance information indicating whether each chat bot is configured to inherit the function of another chat bot and (ii) setting information for executing each function, the setting information associating each chat bot with an external device, wherein the memory includes the function inheritance information and the setting information.

2. The message communication apparatus according to claim 1, wherein the processor causes the second chat bot to respond to a message from the second user, based on the function inheritance information.

3. The message communication apparatus according to claim 2, wherein the processor causes the second chat bot to respond to a message from the second user, if the first chat bot and the second chat bot have a function inheritance relationship.

4. The message communication apparatus according to claim 1, wherein for a message from the second user, the processor causes the second chat bot to be activated in a different messaging service by the first chat bot, and causes the second chat bot to respond to the message.

5. The message communication apparatus according to claim 4, wherein in the different messaging service, the processor causes the first chat bot to send a message from the second user to the second chat bot on behalf of the second user.

6. The message communication apparatus according to claim 4, wherein the processor causes the second user to be guided to the different messaging service by the first chat bot.

7. A non-transitory computer readable medium storing a program causing a computer to execute a process, the process comprising:

activating a chat bot, the chat bot running in a messaging service in which users exchange messages, the chat bot configured to exchange messages with the users using the messaging service;

registering the chat bot for each user; and if a single first chat bot has been activated through an operation made by a first user, causing the first chat bot to execute, in response to a message from a second user different from the first user, a function of a second chat bot registered by the second user based on (i) function inheritance information indicating whether each chat bot is configured to inherit the function of another chat bot and (ii) setting information for executing each function, the setting information associating each chat bot with an external device.

8. A display control method comprising:

activating a chat bot, the chat bot running in a messaging service in which users exchange messages, the chat bot configured to exchange messages with the users using the messaging service;

registering the chat bot for each user; and if a single first chat bot has been activated through an operation made by a first user, causing the first chat bot to execute, in response to a message from a second user different from the first user, a function of a second chat bot registered by the second user based on (i) function inheritance information indicating whether each chat bot is configured to inherit the function of another chat bot and (ii) setting information for executing each function, the setting information associating each chat bot with an external device, and causing a result to be displayed on a screen.

9. A message communication apparatus comprising:

operating means for activating a chat bot, the chat bot running in a messaging service in which users exchange messages, the chat bot configured to exchange messages with the users using the messaging service;

registration means for registering the chat bot for each user; and control means for, if a single first chat bot has been activated in a single chat room through an operation of the operating means by a first user, causing the first chat bot to execute, in response to a message from a second user different from the first user, a function of a second chat bot registered by the second user by using the registration means based on (i) function inheritance information indicating whether each chat bot is configured to inherit the function of another chat bot and (ii) setting information for executing each function, the setting information associating each chat bot with an external device.

* * * * *